(12) United States Patent
Rauba et al.

(10) Patent No.: US 10,611,421 B2
(45) Date of Patent: Apr. 7, 2020

(54) BICYCLE PARKING DEVICE

(71) Applicant: UAB PARKIS, Vilnius (LT)

(72) Inventors: Bronius Rauba, Vilnius (LT); Vygantas Radvila, Vilnius (LT)

(73) Assignee: UAB PARKIS, Vilnius (LT)

( * ) Notice: Subject to any disclaimer, the term of this patent is extended or adjusted under 35 U.S.C. 154(b) by 0 days.

(21) Appl. No.: 16/465,362

(22) PCT Filed: May 17, 2017

(86) PCT No.: PCT/IB2017/052900
§ 371 (c)(1),
(2) Date: May 30, 2019

(87) PCT Pub. No.: WO2018/104800
PCT Pub. Date: Jun. 14, 2018

(65) Prior Publication Data
US 2019/0329832 A1 Oct. 31, 2019

(30) Foreign Application Priority Data

Dec. 9, 2016 (LT) .................................... 2016-115

(51) Int. Cl.
*B62H 3/00* (2006.01)
*A47F 7/00* (2006.01)
(Continued)

(52) U.S. Cl.
CPC ............... *B62H 3/12* (2013.01); *E04H 6/005* (2013.01)

(58) Field of Classification Search
CPC .............. B62H 3/12; B62H 3/08; E04H 6/005
See application file for complete search history.

(56) References Cited

U.S. PATENT DOCUMENTS

| 5,941,397 A * | 8/1999 | Buchanan | ................ B62H 3/12 |
| | | | 211/19 |
| 6,729,478 B1 * | 5/2004 | Boers | ....................... B62H 3/12 |
| | | | 211/18 |

(Continued)

FOREIGN PATENT DOCUMENTS

| EP | 1609708 A1 | 12/2005 |
| JP | S63132058 U | 6/1988 |

(Continued)

OTHER PUBLICATIONS

International Search Report issued in PCT/1132017/052900, dated Aug. 16, 2017, pp. 1-3.

(Continued)

*Primary Examiner* — Kimberly S Wright
(74) *Attorney, Agent, or Firm* — Tutunjian & Bitetto, P.C.

(57) ABSTRACT

A bicycle parking device includes a stand and a trolley mounted in the stand and connected to a lifting unit, which has an elastic element connected with the stand and the trolley, where the elastic element is tight when the trolley is in a lower position. When a bicycle is positioned in an initial parking position, elasticity of the elastic element ensures the lift of the trolley to an upper position. When the bicycle is in the initial parking position with the wheel placed into a wheel fixing mechanism, it fixes the wheel and affects the trolley fixing unit to release and allow the elastic element to transfer the bicycle from the initial parking position to a rear parking position, and when the bicycle is transferred from the rear parking position to the initial position, the wheel fixing mechanism releases the wheel, transferring the trolley to a fixed position.

13 Claims, 5 Drawing Sheets

(51) Int. Cl.
*B62H 3/12* (2006.01)
*E04H 6/00* (2006.01)

(56) References Cited

U.S. PATENT DOCUMENTS

| | | | |
|---|---|---|---|
| 7,771,155 B2* | 8/2010 | Thiel | B25H 1/0014 |
| | | | 187/214 |
| 9,771,249 B2* | 9/2017 | Scott | B66F 7/22 |
| 2009/0196721 A1* | 8/2009 | Thiel | B25H 1/0014 |
| | | | 414/427 |

FOREIGN PATENT DOCUMENTS

| | | |
|---|---|---|
| JP | 3026313 U | 12/1996 |
| KR | 100928165 B | 11/2009 |
| WO | 2014/184817 A1 | 11/2014 |

OTHER PUBLICATIONS

Written Opinion issued in PCT/IB2017/052900, dated Aug. 16, 2017, pp. 1-6.

* cited by examiner

BICYCLE PARKING DEVICE

FIELD OF THE INVENTION

This invention relates to bicycle parking devices, especially to bicycle parking devices for fixing and holding a bicycle, in particular in a vertical position.

DESCRIPTION OF THE RELATED ART

A variety of bicycle parking devices and equipment, such as the widespread horizontal U-shaped bicycle parking stands or hooks on the walls for hanging bicycles, are known and used. These U-shaped stands are inconvenient because bicycles parked in this way occupy a large space that could be used for other purposes. For bicycle parking where bicycles are hung on a hook on a wall, it is difficult to lift and move a bicycle, as it requires high physical strength, the bicycle may fall, and the bicycles can be damaged during lifting or lowering. Thus this method of hanging is not very convenient.

A bicycle parking device for parking several bicycles in a vertical position, forming a structure constructed from the column mounted on a platform, and which has a base plate at the top and a lifting unit automatically lifting and lowering the front wheel, with the aid of a screw, coupled with the corresponding nuts, bushings and motor mounted on a base plate, are known (see the description of the invention according to the Patent WO 2014/184817 published on 20 Nov. 2014).

A shortage of the known bicycle parking device is that the device is for parking several bicycles, therefore it takes up a lot of space, has a complex structure that requires a large amount of various structural elements and a motor which needs electric power sources or other power generation systems.

A bicycle parking device for lifting the bicycle using guides from horizontal position to vertical position, where a device is mounted on the L-shaped vertical wall, with a lifting unit connected to a drive shaft which can be driven by an electric motor, and has a controlled brake system is known (EP 1609708 published on 28 Dec. 2005).

A short fall of this bicycle parking device is that the motor, preferably an electric motor, is used to lift a bicycle and for the brake system, and therefore power sources and other power generation systems are needed. This causes the increase in the price of a device, moreover, it requires a special parking place which would be provided with power sources to lift the bicycle; thus, its use is limited.

SUMMARY OF THE INVENTION

This invention aims to simplify and lower cost of a bicycle parking device with a design to simplify and facilitate the bicycle parking, to expand opportunities for its usability, e.g. to provide a bicycle parking device, which can be positioned and used in different rooms or parking areas, optionally parking the bicycle in any position from horizontal to vertical, depending on the room space. Use of the parking device is simple ensuring parking stability and safety.

One solution is that in the bicycle parking device includes a stand, trolley mounted in the stand with the possibility to move in it on guides and connected to a lifting unit, a wheel fixing mechanism mounted on the trolley, where the lifting unit has at least one elastic element connected with one end to the upper part of the stand, and the other end fixed to the trolley, the elastic element is tight when the trolley is in a lower position, and when the bicycle is positioned in its initial parking position, its elasticity ensures the lifting of the trolley to an upper position. In the lower part of the stand, the trolley fixing unit is connected with the wheel fixing mechanism which is constructed in the way that when the bicycle is in initial parking position with the wheel placed into a wheel fixing mechanism, the wheel fixing mechanism fixes the wheel and affects the trolley in such a way that it releases and allows the elastic element to transfer a bicycle with a wheel fixed in a wheel fixing mechanism from initial parking position to rear parking, preferably a vertical position, by transferring the wheel from rear parking position to an initial, preferably horizontal position, the wheel fixing mechanism affects the trolley fixing unit by transferring a trolley to the fixed position and releases the wheel.

Under this invention, a construction of the bicycle parking device with a stand is provided, where the bicycle is lifted to rear, for example, vertical position, with the aid of an elastic element without requiring high human physical strength and power, which is needed for power sources or other fuel-powered energy sources, additional electrical inputs. The construction of the device can be mounted in various locations on the wall or to the floor, the balcony railing, parking sites or in different rooms, and also small spaces, such as multi-story apartment house balconies, cellars or garages, and the bicycle parked in any position from horizontal to vertical, depending on the room space.

A wheel fixing mechanism in the bicycle parking device includes a base where a wheel holder is mounted in its upper part, the lever is mounted springily on the horizontal axis in the central part and cinematically interacts with a wheel holder and the wheel in such a way that when the wheel is placed in a fixing mechanism, the wheel presses the upper arm of the lever by transferring the lever to the second position where the lever affects a wheel holder, which presses the wheel rim at the spokes from the both sides and the lever has a lever fixer, which fixes the lever in the second position at the same time releasing the trolley fixing unit and allowing the tight elastic element to lift the trolley together with the wheel fixing mechanism mounted on it and a wheel placed in it by transferring a bicycle to rear parking position, preferably to vertical position, and lowering the wheel from rear parking position, preferably vertical position, to initial parking position, preferably horizontal position, a lever fixer interacting with the trolley fixing unit affects the lever by returning it to its initial position where the trolley fixing unit fixes the trolley in the lower position, and the wheel holder releases the wheel, allowing the wheel to displace from the parking device.

Using the wheel fixing mechanism, a wheel rim is fixed at the spokes and the trolley is released and the bicycle is lifted toward rear, for example, vertical position, and when the wheel is lowered to its initial parking position, the trolley is fixed and the wheel is automatically released, and a bicycle parking becomes simple and straight forward. The user does not perform the actions associated with a bicycle fixing, bicycle parking time is reduced, and the stability of the lifted bicycle is ensured.

In the bicycle parking device under this invention, the mentioned wheel holder includes two side arms pivotally and springily attached to the base of the wheel fixing mechanism placed against each other and cinematically interacting with a lever in such a way that depending on the position of the lever may press or release the wheel.

In the bicycle parking device under this invention, the mentioned side arms of the wheel holder include pads, which press the wheel rim at the spokes from the both sides in parking position.

The construction of a wheel support includes two side arm suits for various types of wheels with tires of different width. Using pads, a wheel rim is more pressed by providing stability for the lifted bicycle, and the pads protect from scratches and other types of damage.

A lever fixer in the bicycle parking device under this invention has the lever mounted on an axis and the plate pivotally and springily mounted on it, wherein when the trolley is in lower fixed position, the mentioned lever is connected to a trolley fixing unit fixedly attached to the stand with the aid of a hanging unit when the wheel is placed in the wheel fixing mechanism in its initial position, the plate is located perpendicular to the base and rests on it with a free end and fixes the lever in the mentioned second position, the lever disconnects from the trolley fixing unit enabling the trolley to lift to rear parking position and when the trolley is transferred from rear parking position to initial parking position, the plate of the lever fixing unit rests on the trolley fixing unit fixedly attached to the stand, which pushes the plate by turning it and returning the lever to initial position in which the lever releases the wheel holder and the hanging unit of the lever connects with the trolley fixing unit. A wheel is attached to the end of the plate of the lever fixer which rests against the base of the wheel fixing mechanism In one bicycle parking device, a trolley fixing unit includes a hook, and a hanging unit of the lever can be the axis attached to the lever with a space from it or a hole in the lever.

In one bicycle parking device, the approach path and side supports of the wheel are attached to the trolley.

In one bicycle parking device, the trolley has wheels which can roll on guides, preferably on rails mounted in the stand.

In one bicycle parking device, an elastic element is optionally at least one of rubber or at least one spring.

The bicycle parking device under this invention is provided with the trolley stopper mounted on the trolley and is designed as a pedal, one end of which is lifted and the other end rigidly fixes the trolley in its initial position, until the wheel is not placed in a wheel fixing mechanism, and when the wheel is placed in it, it is pressed by the wheel holder and at the same time the wheel presses the mentioned lifted end of the pedal allowing the trolley with the wheel fixing mechanism and the wheel mounted in it to lift to rear parking position.

BRIEF DESCRIPTION OF THE DRAWINGS

The invention is explained in more detail in figures which represent.

DETAILED DESCRIPTION OF THE EMBODIMENTS

Figure 1:
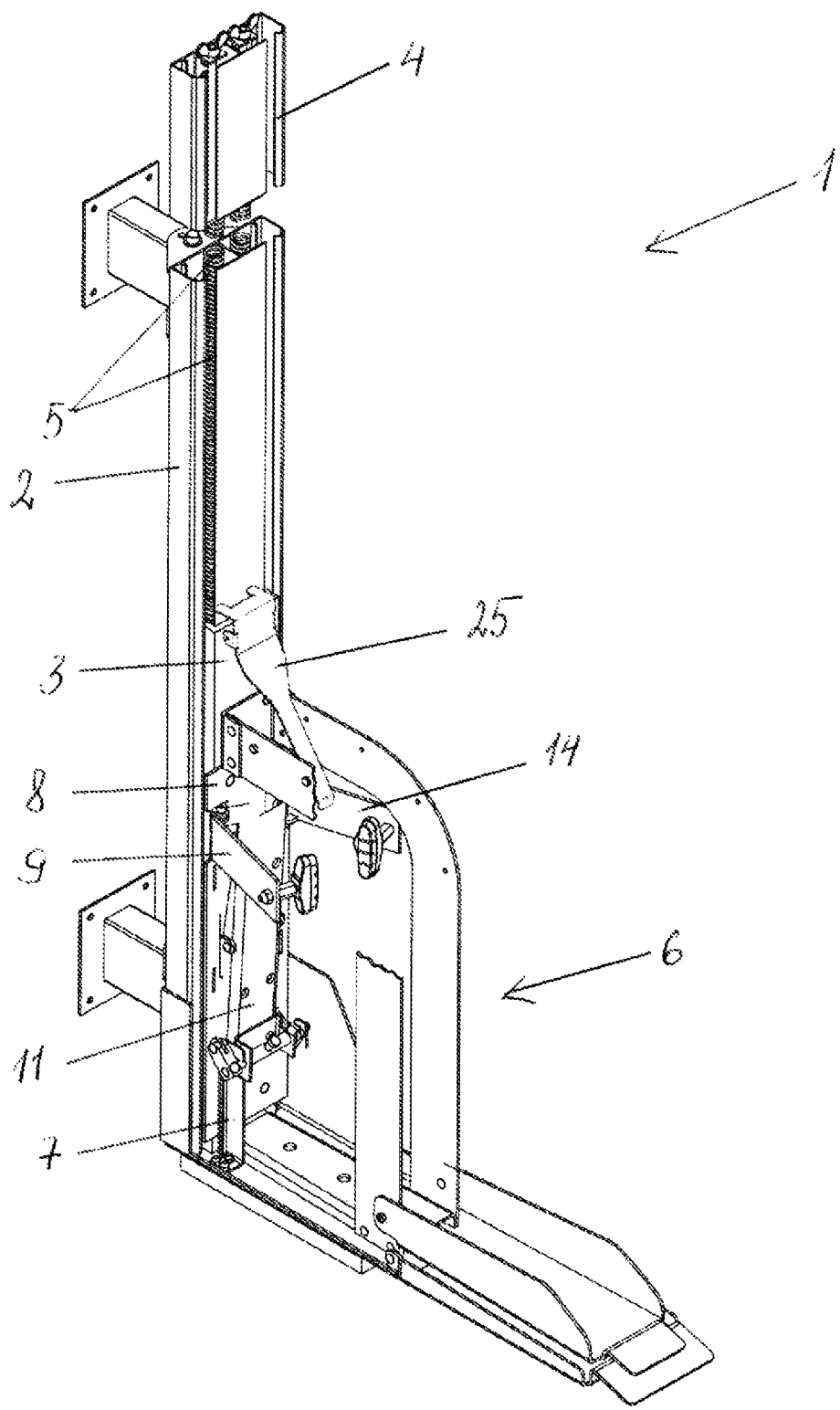
FIG. 1—an overall view of the bicycle parking device with a wheel fixing unit implemented as an axis when the trolley is in lower position.
Figure 2:
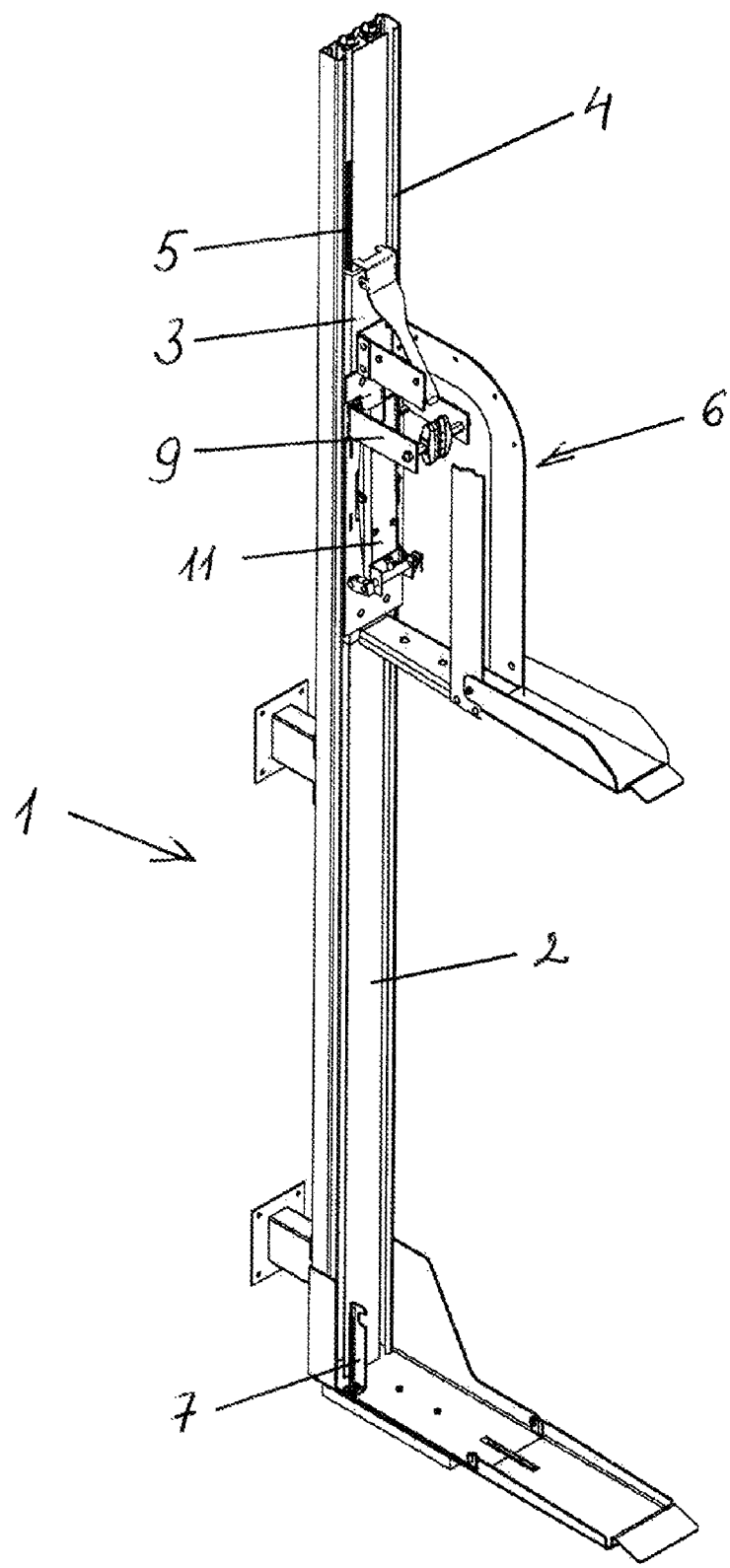
FIG. 2—an overall view of the bicycle parking device with a wheel fixing unit implemented as an axis when the trolley is in rear parking position.
Figure 3:
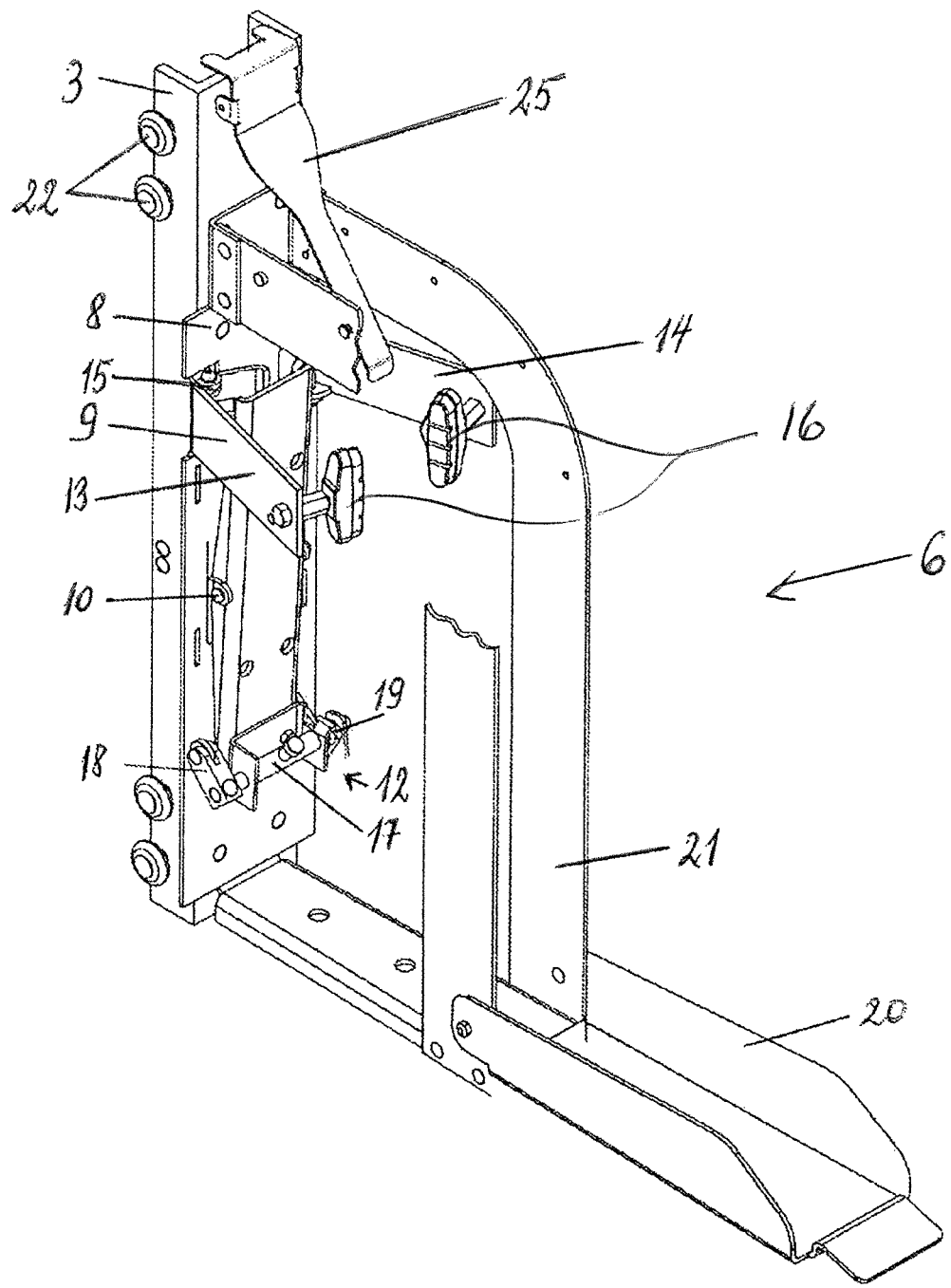
FIG. 3—the bicycle parking device with a wheel fixing unit implemented as an axis when the trolley is in lower position.
Figure 4:
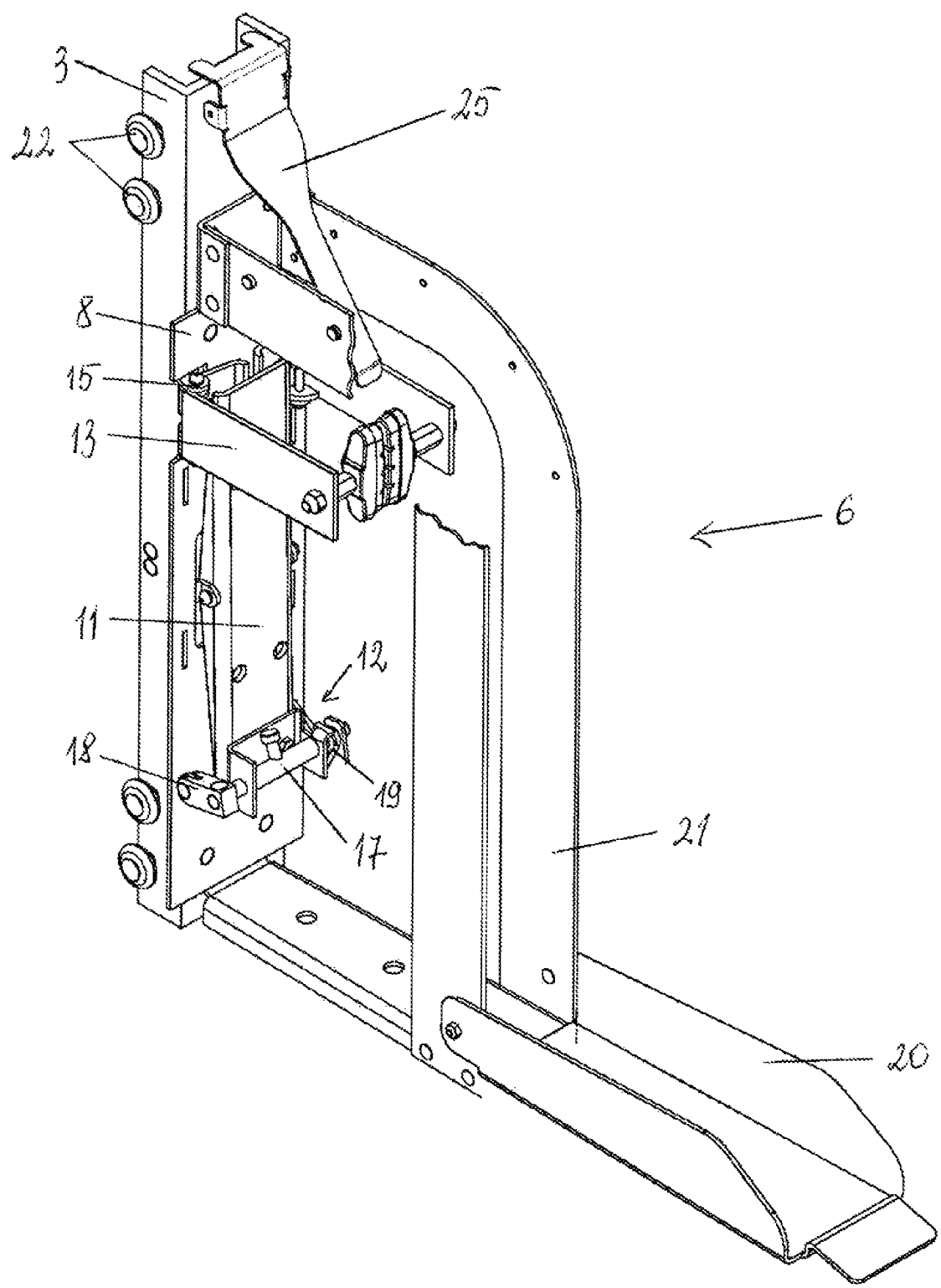
FIG. 4—the bicycle parking device with a wheel fixing unit implemented as an axis in rear parking position.
Figure 5:
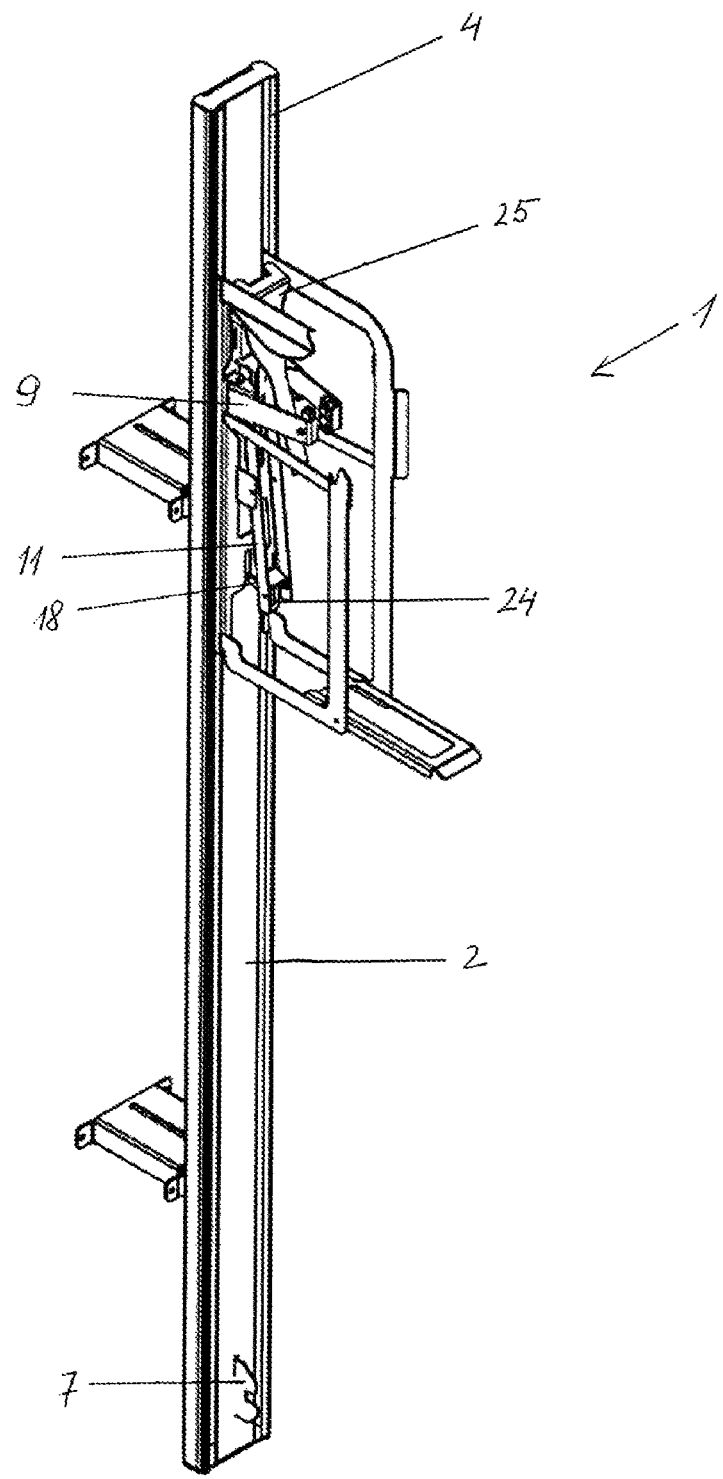
FIG. 5—an overall view of the bicycle parking device with a wheel fixing unit implemented as a hole in the lever.

The bicycle parking device 1 comprises a stand 2, trolley 3 mounted in the stand with the possibility to move in it on guides 4 and connected to the lifting unit 5. The wheel fixing mechanism 6 is mounted on the mentioned trolley 3. The lifting unit 5 is an elastic element, for example, two springs 5 or a rubber connected with the upper end to the upper part of the stand 2, and the other end is fixed to the trolley 3 and the elastic element is tight when the trolley 3 is in lower position. Elasticity of the lifting unit 5 is selected such as to ensure rising of the wheel to rear parking position, which depending on the chosen elasticity of a spring or rubber may be any position from horizontal to vertical position. A trolley fixing unit 7 fixedly mounted in the stand 2 may be a hook 7. The wheel fixing mechanism 6 has the base 8 attached to the trolley 3 where a wheel holder 9 is attached to its upper part; the lever 11 is mounted on the horizontal axis 10 in the central part, which has a lever fixer 12 in the lower part. The lever 11 is provided to interact cinematically with a wheel during the initial bicycle parking, and a wheel holder 9, fixating a wheel. The wheel holder 9 comprises two L-shaped side arms 13, 14 springily and pivotally attached to the base 8 of a wheel fixing mechanism 6 located opposite to each other and connected to the spring 15 and cinematically interacting with a lever 11. The mentioned side arms 13, 14 of the wheel holder 9 have pads 16 which press the wheel rim at the spokes from the both sides during the parking.

The lever fixer 12 comprises an axis 17, which is attached to the lower part of the lever 11, the plate 18, which is mounted on it and is connected to a spring 19 which is tight during the parking. A wheel is attached to the end of the plate 18 which rests against the base 8.

The approach path 20 and side wheel supports 21 are pivotally attached to the front part of the trolley 3. The trolley 3 comprises wheels 22 which can roll on guides 4, preferably on rails mounted in the stand 2.

The lever has the hanging unit 23 which optionally is the axis 17 mounted to the lever with a space or a hole 24 in the lever.

A stopper is mounted on the trolley (3) and designed as a pedal (25) which at one end has rubber pads, which are pressed against the stand in the lower initial position of the trolley when the other end of the pedal is lifted.

Device Operating Principles

In the case of horizontal parking, the wheel is placed in the wheel fixing mechanism 6 of the bicycle parking device 1. In this way, the front wheel on both sides of the wheel rests on the side supports 21 and stands in horizontal position.

When the bicycle parking position is selected vertically, the wheel is pushed into the wheel fixing mechanism 6 completely until it rests on the pedal 25 and the lever 11, located in the central part of the wheel fixing mechanism 6. The wheel fixing mechanism 6 is mounted on the trolley 3 in the stand rails 4 and which may move upwards and downwards. The lower part of the trolley 3 and the upper part of the stand are connected by two springs 5. When the wheel fixing mechanism 6 is located in lower position of the device, springs 5 are tight and a wheel fixing mechanism 6 is hung with the hook 7, attached to the lower part of the stand of the bicycle parking device 2 that the fixing mechanism 6 would not lift upwards, optionally through an axis 17 or the hole (24) in the lower part of a lever. Axis 17 is mounted in the lower part of a lever 11 of the wheel fixing mechanism.

When the front wheel is pushed in completely, the wheel presses the pedal 25 having an end with rubber pads which is lifted and releases the trolley. At the same time, the wheel presses the upper arm of the lever 11 and at the same time the upper arm of the lever presses lower parts of side arms 13, 14 of L-shaped wheel holder 9 located below the lever. Then, the upper parts of side arms 13, 14 of the wheel holder 9 move towards each other and stand parallel to the plane of the wheel. Rubber pads 16 located in the upper part of the side arms 13, 14 press the front wheel against both sides at the spokes of the wheel rim and thus fix it. As the lever 11 is mounted on the axis, when the upper arm of the lever 11 is pressed, the lower arm of the lever lifts, and a plate 18 which is pivotally and springly mounted on the lever fixer and connected to the tight spring 19 is located perpendicular to the base 8 and fixes the lever 11 preventing the lever 11 to return to its initial parking position. When the lower arm of the lever lifts, at the same time, a hanging unit which is optionally either an axis 17 or the hole in the lever that holds the trolley 3 and a wheel fixing mechanism 6 are uncoupled. The released trolley 3 and a wheel fixing mechanism 6 together with the fixed wheel are lifted upwards by rails 4 with the aid of springs 5. The rear wheel is pushed by hand into the lower part of the stand 2, and the bicycle is placed in vertical position.

When the bicycle is lowered to the horizontal position, the bicycle is taken by the saddle and pulled towards the user. Because of the weight of the frontal part of the bicycle, a wheel fixing mechanism 6 goes down. When a wheel fixing mechanism 6 goes down, the plate 18 of the lever fixer 12 rest on the hook 7, which with its upper part pushes the plate 18 of the lever fixer 12 by turning it and the lever 11 returns to its initial position with the aid of springs. When the lever 11 returns to the initial position, the lower arm goes down and the axis 17 or hole 24 connects with a hook 7 and thus fixes the wheel fixing mechanism 6 and hence the upper part of the lever 11 releases side arms (13, 14) of the wheel holder with rubber pads 16, they also return to their initial position with the aid of springs. The lever 11 pushes the wheel from the wheel holder 9 and the side supports 21 with the aid of springs, and the wheel easily leaves the wheel fixing mechanism 6. Pushed wheel releases the end pressed by a pedal and the other end of the pedal 25 with rubber pads goes down and rests on the stand (2).

The invention claimed is:

1. A bicycle parking device comprising:
  a stand, a trolley mounted in the stand, enabling guides to guide the trolley, the trolley being connected to a lifting unit,
  a wheel fixing mechanism mounted on the mentioned trolley, wherein the lifting unit has at least one elastic element with one end connected to an upper part of the stand, and the other end attached to the trolley,
  wherein an elastic element is tight when the trolley is in a lower position, and when a wheel of a bicycle is positioned in an initial parking position, the elastic element includes an elasticity that ensures the lift of the trolley to an upper position,
  a trolley fixing unit being mounted in a lower part of the stand which is connected to the wheel fixing mechanism, which is constructed such that when a bicycle is in the initial parking position with the wheel placed in the wheel fixing mechanism, the wheel fixing mechanism fixes a wheel and affects the trolley in such a way that the wheel fixing mechanism releases and allows the elastic element to transfer the bicycle with the wheel fixed in the wheel fixing mechanism from the initial parking position to a selected rear parking position, and from the rear parking position to the initial parking position,
  the wheel fixing mechanism affecting the trolley fixing unit by transferring the trolley to the initial fixed position to release the wheel,
  wherein the wheel fixing mechanism comprises a base where a wheel holder is mounted in its upper part, a lever is mounted springly on a horizontal axis in a central part and interacts with the wheel holder and the wheel in such a way that when the wheel is placed in the wheel fixing mechanism, the wheel presses an upper arm of the lever to transfer the lever to a second position where the lever affects the wheel holder, which presses both sides of a wheel rim of the wheel.

2. The bicycle parking device according to claim 1, wherein the lever has a lever fixer, which fixes the lever in the mentioned second position at the same time releasing the trolley fixing unit and allowing the elastic element to lift the trolley together with the wheel fixing mechanism mounted thereon and the wheel placed in the wheel fixing mechanism by transferring a bicycle to the rear parking position, and lowering the wheel from the rear parking position to the initial parking position, the lever fixer interacting with the trolley fixing unit to affect the lever by returning the lever to its initial position where the trolley fixing unit fixes the trolley in a lower position, and the wheel holder releases the wheel allowing the wheel to displace from the parking device.

3. The bicycle parking device according to claim 2, wherein the wheel holder comprises two side arms pivotally and springly attached to the base of the wheel fixing mechanism and placed against each other and interacting with the lever in such a way that depending on the position of the lever, presses or releases the wheel.

4. The bicycle parking device according to claim 3, wherein the two side arms of the wheel holder comprise pads, which press both sides of the wheel rim at the spokes.

5. The bicycle parking device according to claim 2, wherein the lever fixer has an axis attached to the lever and a plate is pivotally and springly mounted thereon, such that when the trolley is in lower fixed position, the mentioned lever is connected to the trolley fixing unit and fixedly attached to the stand with the aid of a hanging unit when the wheel is placed in the wheel fixing mechanism in an initial position, the plate being located perpendicular to the base and resting on the base with a free end to fix the lever in the mentioned second position, the lever disconnecting from the trolley fixing unit to enable the trolley to lift to the rear parking position, and when the trolley is transferred from the rear parking position to the initial parking position, the plate of the lever fixing unit rests on the trolley fixing unit fixedly attached to the stand, which pushes the plate by turning and returning the lever to the initial position in which the lever releases the wheel holder and the hanging unit of the lever connects with the trolley fixing unit.

6. The bicycle parking device according to claim 1, wherein the trolley fixing unit includes a hook.

7. The bicycle parking device according to claim 5, wherein the hanging unit of the lever includes the axis attached to the lever with a space from the lever or a hole in the lever.

8. The bicycle parking device according to claim 1, wherein side wheel supports are provided with the trolley.

9. The bicycle parking device according to claim 1, wherein the trolley comprises wheels which roll on guides in the stand.

10. The bicycle parking device according to claim 1, wherein the elastic element includes a rubber element or a spring.

11. The bicycle parking device according to claim 1, wherein an approach path is pivotally attached to a front part of the trolley.

12. The bicycle parking device according to claim 1, further comprising a trolley stopper mounted on the trolley and configured as a pedal having one lifted end, and the other end rigidly fixed to the trolley in an initial position when the wheel is not placed in a wheel fixing mechanism and when the wheel is placed in the wheel fixing mechanism the wheel is pressed from both sides by the wheel holder when the wheel presses the lifted end of the pedal causing the other end of the pedal to release the trolley, thus allowing the trolley with the wheel fixing mechanism and the wheel mounted therein to lift to the rear parking position.

13. The bicycle parking device according to claim 5, wherein the end of the plate rests against the base where a wheel is provided.

* * * * *